United States Patent
Ziarko et al.

(10) Patent No.: US 12,379,161 B2
(45) Date of Patent: Aug. 5, 2025

(54) STEAM CONDENSER WITH HEAT EXCHANGER AND A COOKING OVEN WITH SUCH STEAM CONDENSER

(71) Applicant: "RETECH" SPOLKA Z OGRANICZONA ODPOWIEDZIALNOSCIA, Mielec (PL)

(72) Inventors: Andrzej Ziarko, Mielec (PL); Boguslaw Ziarko, Murnau (DE); Krzysztof Ziarko, Mielec (PL)

(73) Assignee: "RETECH" SPOLKA Z OGRANICZONA ODPOWIEDZIALNOSCIA, Mielec (PL)

( * ) Notice: Subject to any disclaimer, the term of this patent is extended or adjusted under 35 U.S.C. 154(b) by 261 days.

(21) Appl. No.: 18/030,287

(22) PCT Filed: Oct. 26, 2020

(86) PCT No.: PCT/PL2020/050076
§ 371 (c)(1),
(2) Date: Apr. 5, 2023

(87) PCT Pub. No.: WO2022/093052
PCT Pub. Date: May 5, 2022

(65) Prior Publication Data
US 2023/0384043 A1    Nov. 30, 2023

(51) Int. Cl.
*F28B 1/06* (2006.01)
*A47J 27/04* (2006.01)
(Continued)

(52) U.S. Cl.
CPC .............. *F28B 1/06* (2013.01); *A47J 27/04* (2013.01); *F28B 9/08* (2013.01); *F28D 7/085* (2013.01);
(Continued)

(58) Field of Classification Search
CPC ....... A21B 3/04; A21J 2027/043; A47J 27/04; F24C 15/003; F24C 15/2042; F28B 1/06;
(Continued)

(56) References Cited

U.S. PATENT DOCUMENTS

| 5,301,652 A | * | 4/1994 | Willis | F24C 15/327 126/369 |
| 9,557,082 B1 | | 1/2017 | Colburn | |
| 2022/0132867 A1 | * | 5/2022 | Ziarko | F28D 1/024 126/299 E |

FOREIGN PATENT DOCUMENTS

| CN | 210014672 U | * | 2/2020 | |
| DE | 102018122489 A1 | * | 3/2020 | ............... A21B 3/04 |
| EP | 1530901 A1 | * | 5/2005 | ............... A21B 3/04 |

OTHER PUBLICATIONS

Machine Translation of CN 210014672 (Year: 2025).*

* cited by examiner

*Primary Examiner* — Eric S Ruppert
*Assistant Examiner* — Hans R Weiland
(74) *Attorney, Agent, or Firm* — Dickinson Wright PLLC; Andrew D. Dorisio

(57) ABSTRACT

A steam condenser for a cooking oven having a housing, side walls and at least partly open front side and back side to facilitate flow of cooling air through the steam condenser, and a heat exchanger located in said housing that includes connected finned tubes through which water vapor with other gases from the cooking oven are guided. The steam condenser includes a condensate drainage system that the (Continued)

finned tubes are arranged between the side walls of the housing and in a descending manner, such that each tube has one end attached to the side wall of the housing higher than the other end, and each two adjacent ends of adjacent tubes are located one higher than the other. The adjacent ends of the adjacent finned tubes are connected by 180° connectors, such that the finned tubes are interconnected in a zigzag manner. The highest or the lowest of the finned tubes is connected to a final descending tube which has orifices in an upper part and located on the side of the final descending tube that is facing away from the flow of the cooling air.

11 Claims, 9 Drawing Sheets

(51) Int. Cl.
    *F28B 9/08*           (2006.01)
    *F28D 7/08*           (2006.01)
    *F28F 1/24*           (2006.01)
    *F28F 17/00*         (2006.01)

(52) U.S. Cl.
    CPC ............... *F28F 1/24* (2013.01); *F28F 17/005* (2013.01); *A47J 2027/043* (2013.01)

(58) Field of Classification Search
    CPC ........ F28B 9/08; F28D 7/085; F28D 21/0014; F28F 1/24; F28F 9/26; F28F 17/005; F28F 2230/00
    See application file for complete search history.

STEAM CONDENSER WITH HEAT EXCHANGER AND A COOKING OVEN WITH SUCH STEAM CONDENSER

TECHNICAL FIELD

The present invention relates to a steam condenser equipped with a heat exchanger acting as a water vapor condenser, for use in gastronomic ovens, especially combi steamers, as well as to a cooking oven equipped with such steam condenser.

BACKGROUND

In the known state of art, there are many steam condensers to use with combi steamers and one can distinguish two main directions of their development.

One is when steam supplied from the combi steamer is directed to a group of parallel tubes that are finned and there is a flow of air directed perpendicularly to the tubes which serves for cooling down and condensing the steam, while the tubes are slightly inclined to direct the condensate. One such design is known from U.S. patent U.S. Pat. No. 9,557,082B1. However, that design has several drawbacks, e.g. the steam is directed through the cooling tubes only once which is often not sufficient to cool and condense the steam. One way to solve this problem is to increase flow of the cooling air, the other is to increase the number of the tubes and there are yet other solutions, like adding additional cooling/condensing chambers to the device, however this often increases the dimensions or the noise generated by the steam condenser.

The other is when steam supplied from the combi steamer is directed to a zigzagging tube, that is located within a heat exchanger made of a plenty of thin metal plates—such device is presented e.g. in Chinese document CN210014672U. Such structure serves as a cross-flow heat exchanger and provides a good cooling/condensing performance, however it is difficult to create as it requires precise machining. Furthermore, the condensate has to be directed out of the heat exchanger.

In view of the above, it is apparent that there is a need for a compact steam condenser, that would allow for a good cooling/condensing performance, would be much easier to produce/maintain and would allow for a longer work without the risk of failure.

SUMMARY

The object of the invention is a steam condenser for a cooking oven, especially for a combi steamer, having a housing, having side walls and having at least partly open front side and back side to facilitate flow of cooling air through the steam condenser, and a heat exchanger located in said housing, which serves as a condenser, wherein the heat exchanger comprises a number of connected finned tubes through which water vapor with other gases from the cooking oven, especially combi steamer, are guided, wherein the steam condenser comprises a condensate drainage system, characterized in that the finned tubes are arranged between the side walls of the housing and in a descending manner, such that each tube has its' one end attached to the side wall of the housing higher than the other end, while also each two adjacent ends of adjacent tubes are located one higher than the other, wherein the adjacent ends of the adjacent finned tubes are connected by a 180° connectors, such that the finned tubes are interconnected in a zigzag manner, wherein the highest or the lowest of the finned tubes is further connected to a final descending tube which is provided with orifices in its' upper part and located on the side of the final descending tube that is facing away from the flow of the cooling air.

Preferably, the inclination of the finned tubes is from 0.5° to 10° to the horizontal plane, preferably 2°, 4°, 6° or 8°.

Preferably, the finned tubes are made of metal, preferably stainless steel, copper or aluminum.

Preferably, the 180° connectors are made from two symmetrical parts made of plastic material that is resistant to temperatures of at least 220° C., such as polysulfide or PEEK, wherein said parts are joined by any suitable means, especially by screws, rivets, adhesive, pressure welding, multi-component injection, especially two-component injection, or any combination thereof.

Preferably, the 180° connectors are further equipped with elastic seals, especially O-rings, wherein each of the seals is located in a groove present near the one of the ends of the respective connector, wherein there are two seals by each connectors' end.

Preferably, the internal diameter of the formed 180° connector is identical to the internal diameter of the finned tubes, while the internal diameter of the connector near its' ends is a larger than the external diameter of the ends of the finned tubes that are to be accommodated by the connector.

Preferably, it is further equipped with a turbine or a ventilator configured to force the flow of gases through the finned tubes.

Preferably, the turbine or the ventilator is located in direct contact with the final descending tube with orifices.

Preferably, the turbine or the ventilator is centrifugal.

Preferably, the finned tube closest to the back side of the housing is the highest one and the finned tube closest to the front side of the housing is the lowest one, wherein it is further configured such that the gases from the cooking oven are guided to flow from the highest finned tube to the lowest finned tube.

A further object of the invention is a cooking oven, especially a combi steamer, characterized in that it is equipped with a steam condenser according to the invention.

BRIEF DESCRIPTION OF THE DRAWINGS

The present invention will be presenter in greater detail in correspondence to accompanying drawings, where.

DETAILED DESCRIPTION

NUMERALS

Figure 1:
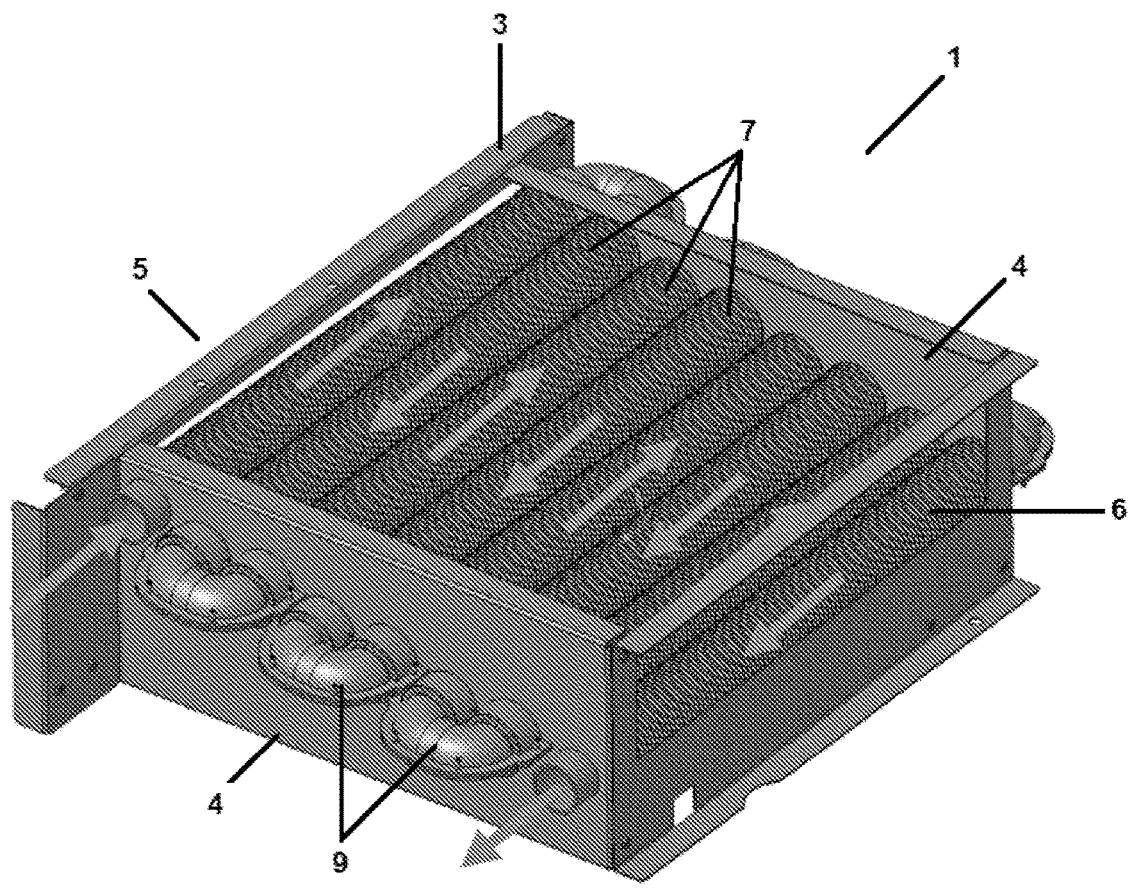
FIG. 1 shows a perspective view of one of the embodiments of the condenser according to the invention, with marked direction of the flow of vapor through the finned tubes.

1—steam condenser
2—hood of the combi steamer with steam condenser
3—housing of the steam condenser
4—side walls of the housing
5—front side of the housing
6—back side of the housing
7—finned tube
8—end of a finned tube
9—180° connector
10—orifices provided in the final descending finned tube
11—elastic seal
12—groove provided near the end of the connector
13—connectors' end
14—turbine/ventilator
15—bonding groove
16—bonding material Referring to FIG. 1, the steam condenser 1 according to the invention is comprised of a number of straight finned tubes 7, that are located in a housing 3 with openings on two sides of the housing (mainly—on the front side 5 and on the back side 6) that allow for a flow of a cooling air. The tubes 7 are arranged in a descending (or ascending) manner—each tube 7 has its' one end 8 attached to the housing 3 higher than the other end 8, while also each two adjacent ends 8 of the adjacent tubes 7 are located one higher than the other. Thus, the set of the finned tubes 7 forms a descending (or ascending) zigzag that the water vapor (and possible other gasses from the combi steamer) is forced to go through (see FIG. 1).

Figure 2:
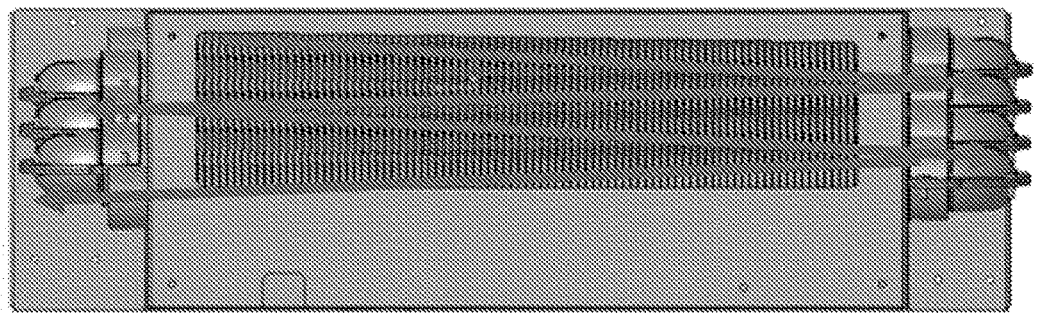
FIG. 2 shows a perspective view of one of the embodiments of the condenser according to the invention, with marked direction of the flow of the condensate through the finned tubes.
Figure 3:
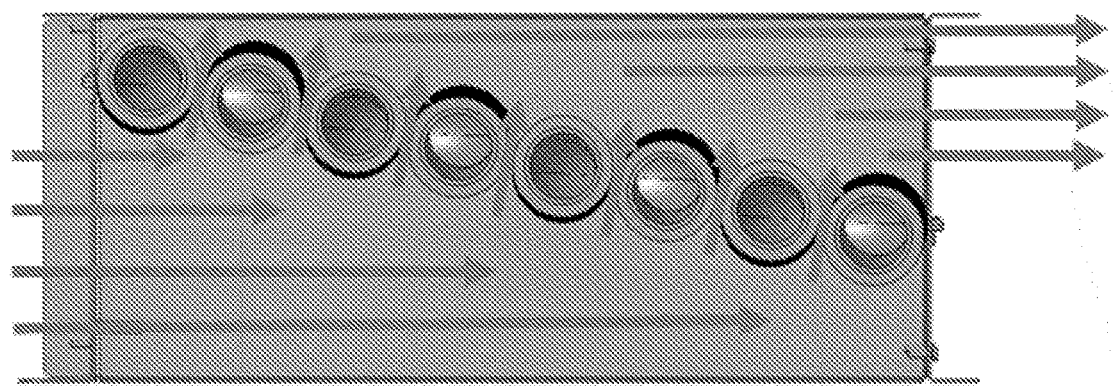
FIG. 3 shows a side view of one of the embodiments of the condenser according to the invention, with marked one configuration of the flow of the cooling air.
Figure 4:
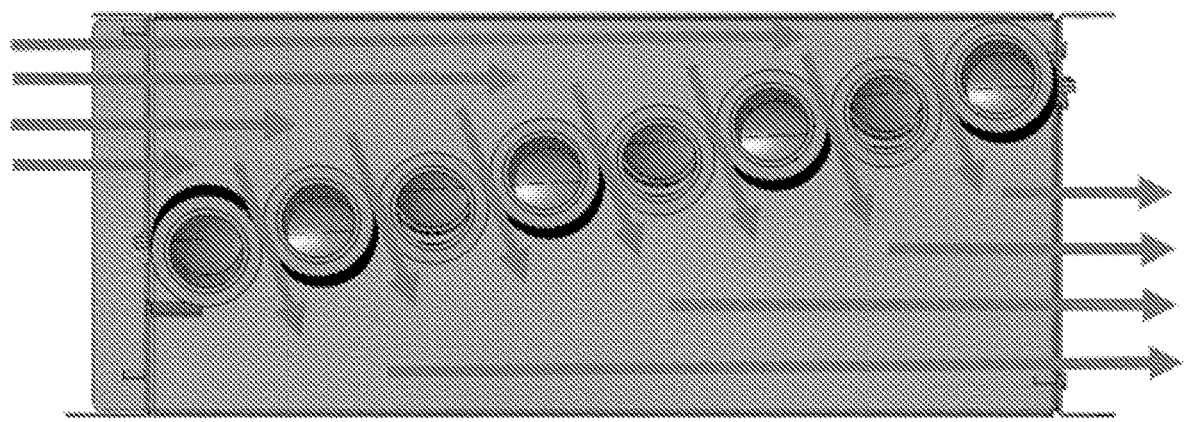
FIG. 4 shows a side view of one of the embodiments of the condenser according to the invention, with marked second configuration of the flow of the cooling air.

Also, thanks to the inclination of each tube 7 as well as inclination between connected with 180° connectors 9 ends of the tubes 8—condensate that forms inside the tubes 7 is provided with a natural path that it can follow due to the gravity (see arrows on FIG. 2). Thus, there is no need for any additional means that would lead or pump out the condensate from the steam condenser 1—condensed water can easily flow down and finally out of the device. This also allows for two main configurations of the tubes 7 inside the housing:

one, where the tube closest to the front-side 5 of the housing 3 it the highest one (see FIG. 3), second, where the tube closest to the front-side 5 of the housing 3 is the lowest one (see FIG. 4).

Some of the applications of the steam condenser 1 might prefer the configuration shown in FIG. 3 (where the cooling air flows upwards between the finned tubes 7), while in other applications the configuration shown in FIG. 4 (where the cooling air flows downwards between the finned tubes 7) might be more preferable.

Furthermore, in some configurations of the steam condenser 1 the water vapor and other gases from the combi steamer might be directed to flow from the highest (relative to the housing 3) tube to the lowest tube (see FIG. 1), or it might be directed to flow in the opposite direction, i.e. from the lowest to the highest of the tubes 7. In both of these configurations it is still ensured (thanks to the inclination of the heat exchanger that is constituted by the finned tubes 7) that the condensed liquid will follow the path downwards, regardless of which direction gases will flow through the tubes.

Figure 10:
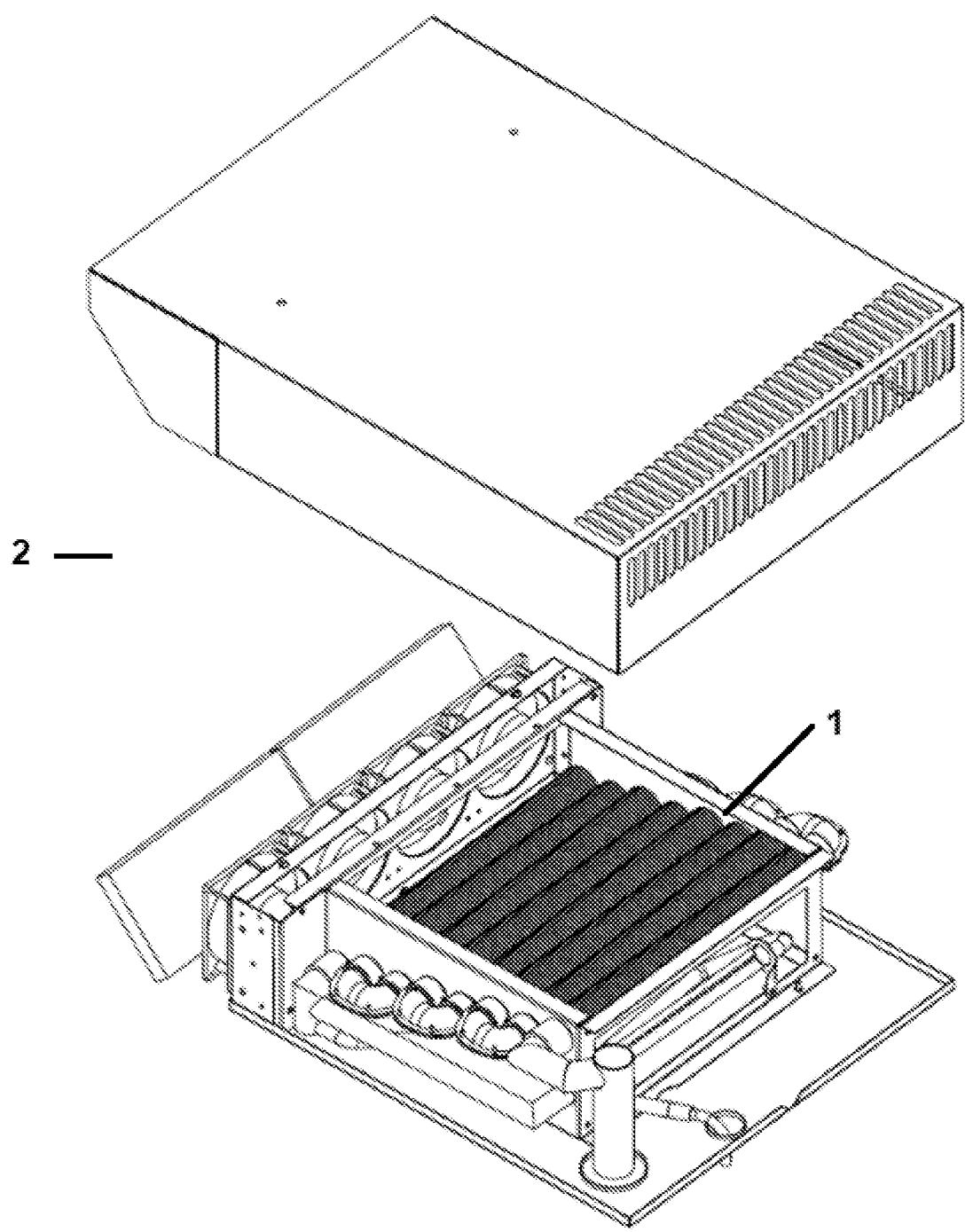
FIG. 10 is a perspective view of the hood for the combi steamer with the steam condenser according to one of the embodiments of the invention.

It is contemplated, that because of the above many configurations of the invention are possible and preferable—all of them are within the scope of protection of the present invention. In some applications the configuration, where the gases from the combi steamer are directed firstly through the highest of the finned tubes 7 and closest to the back side 6 of the housing 3 and towards the lowest tube that is closest to the front side 5 of the housing 3 (see FIG. 5 and FIG. 10), is the most preferable, as it is configured as a cross-flow type heat exchanger and it presents especially desirable performance to size ratio.

Figure 5:
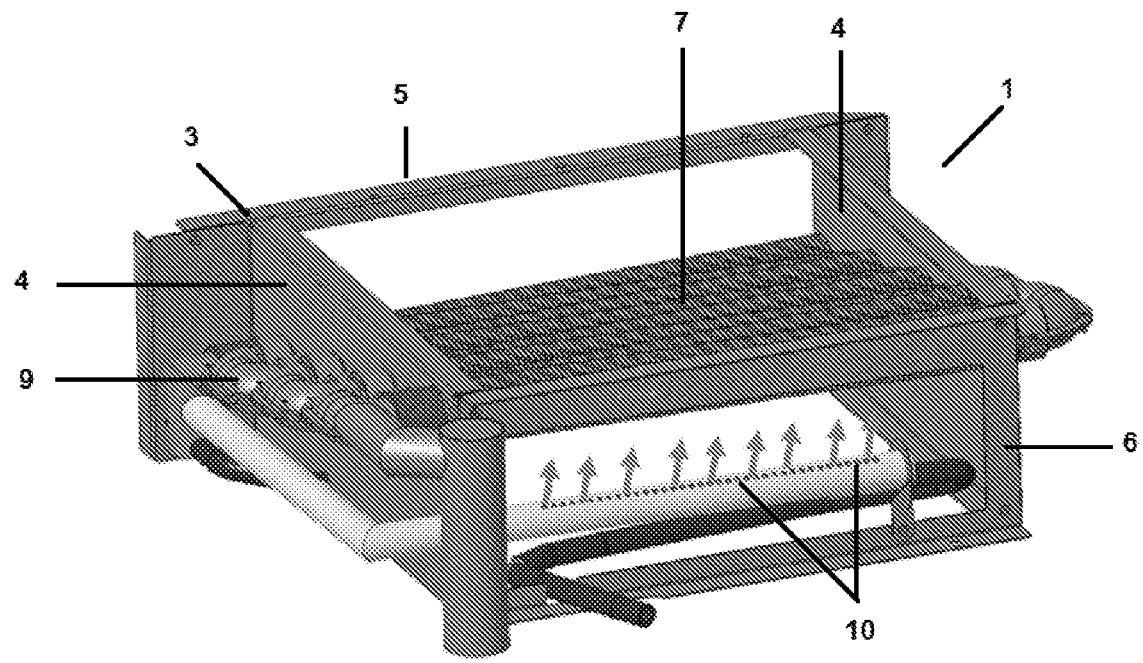
FIG. 5 shows condenser according to one of the embodiments of the invention from the back, with visible section of the tube with openings that allow uncondensed gases to escape and be carried out by the cooling air.
Figure 6:
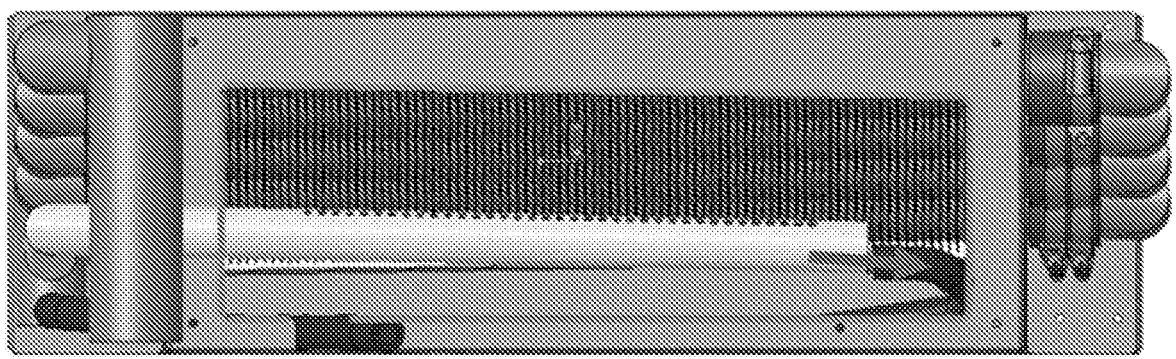
FIG. 6 is a back view of the condenser according to one of the embodiments of the invention that presents inclination of the tube with openings from FIG. 5.

As it is shown on FIG. 5, the last of the set of the finned tubes 7 is connected to a two-channel connector. Said connector is then connected with two further tubes—first (in light grey on FIG. 5) is a final descending tube which serves as a final channel to allow for uncondensed gases to be sucked out by the flow of the cooling air via a set of orifices 10 (see arrows on FIG. 5), said final descending tube being then connected to a condensate tube (black on FIG. 5, see also arrow on FIG. 6) and which is further joined with a second tube, directly connected to the two-channel connector (see FIG. 5). The location of the orifices 10 is important, as to not allow for the air to enter the final descending tube—therefore the orifices 10 should be located in the upper part of the final descending tube and on the opposite side to the flow of the cooling air. The orifices 10 are preferably circular or oval in shape. Thus, a condensate drainage system of the steam condenser is formed, and it allows for an easy and convenient drainage of the condensate through a single condensate tube, without any additional equipment or devices.

Figure 7:
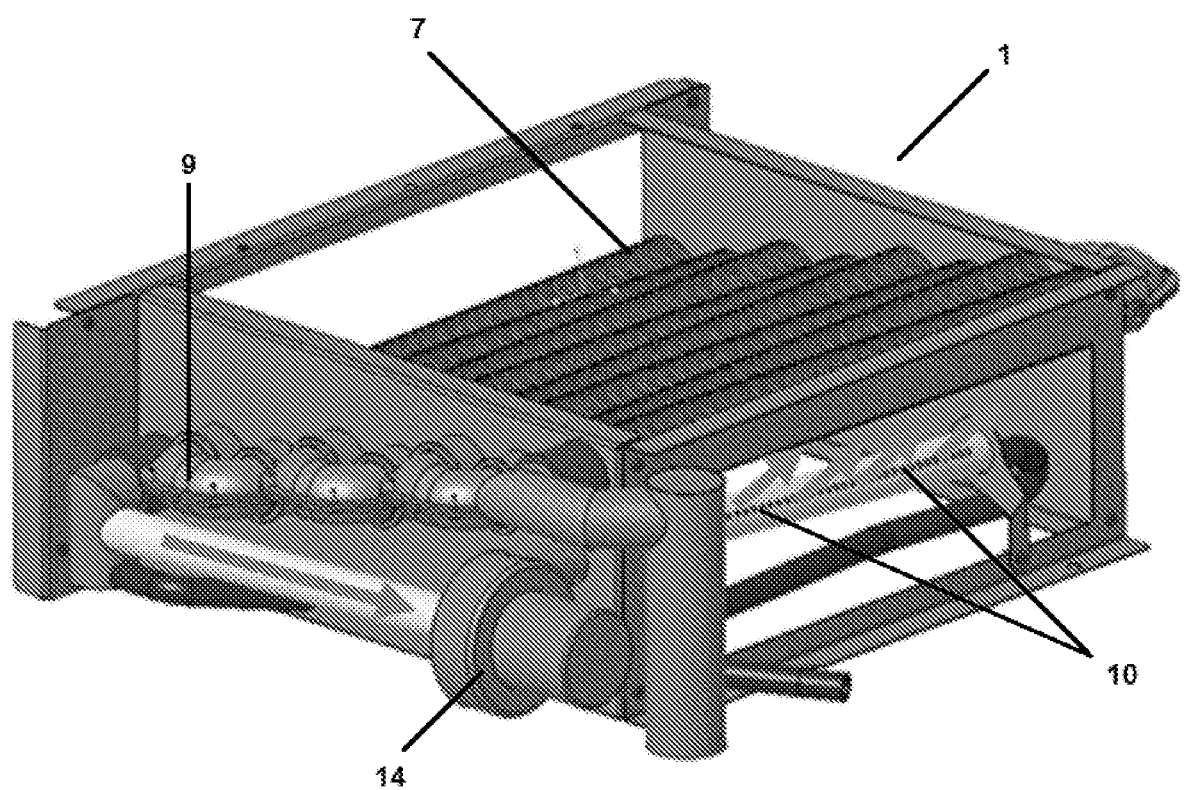
FIG. 7 is a perspective view of the condenser according to one of the embodiments of the invention with an additional turbine to force the flow of the water vapor.

In some embodiments there is a need to enhance the flow of the water vapor and other gases through the condenser 1—in such applications an additional turbine/ventilator 14 is preferably added to the steam condenser 1. It has been found that especially suitable please to locate such a supplementary ventilator 14 is just before the tube serving as a final channel allowing for uncondensed gases to be sucked out (see FIG. 7). Such a turbine/ventilator 14 is preferably of a type of a centrifugal fan. In such a configuration the final descending tube with the orifices 10 can be located higher than the two-channel connector, thanks to the increase in flow speed caused by the fan.

Figure 8:
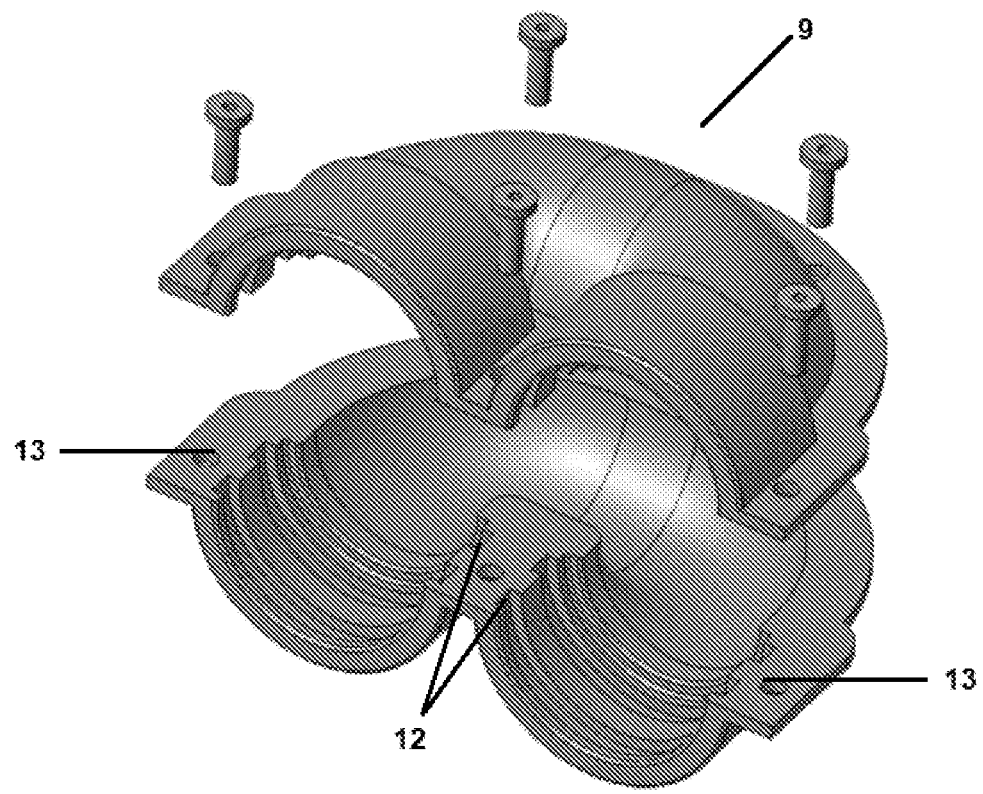
FIG. 8 is an exploded view of an exemplary 180° connector that joins respective ends of the tubes.

On FIG. 8 there is shown an exploded view of the 180° connector 9 designed to join the adjacent ends 8 of the finned tubes 7. It is an elbow-like connector, that is comprised of two symmetrical parts made of a plastic material, that is resistant to high temperatures (of more than 220° C.). Both parts of the connector 9 can be joined using screws, rivets (as shown on FIG. 8), by an adhesive, by pressure welding or by multi-component (especially—two component) injection, or by any combination thereof.

Figure 11:
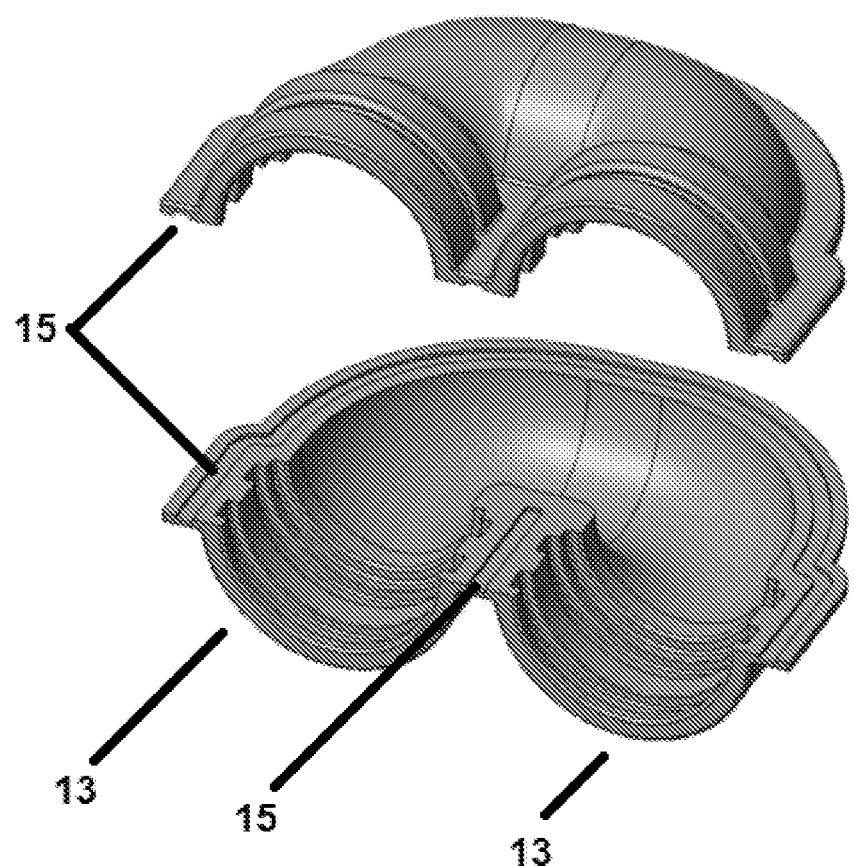
FIG. 11 is an exploded view of a 180° connector provided with grooves for joining multi-component injection.
Figure 12:
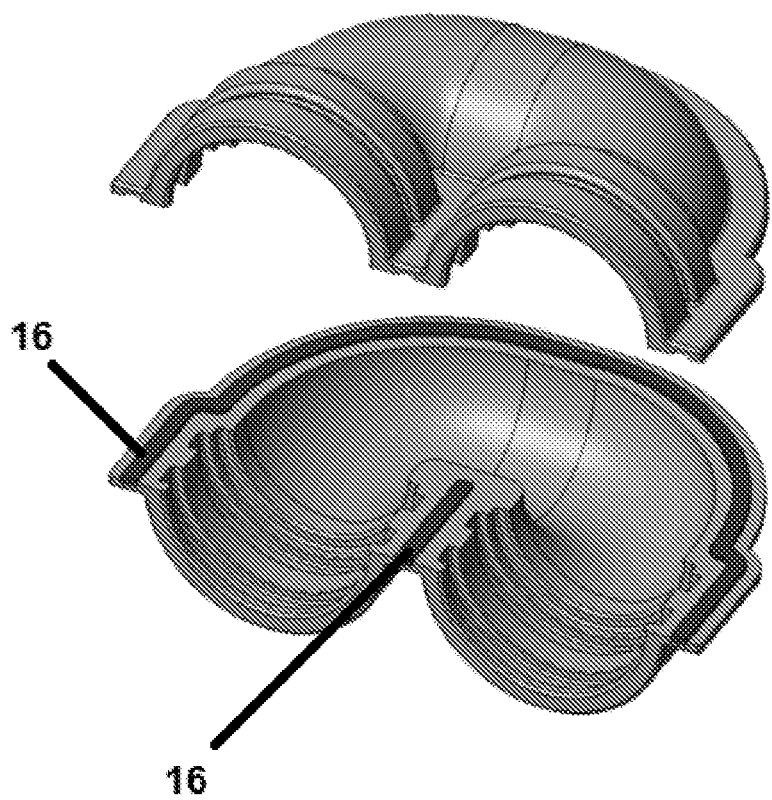
FIG. 12 is a exploded view of a part from FIG. 11 with multi-component material present in the grooves.
Figure 13:
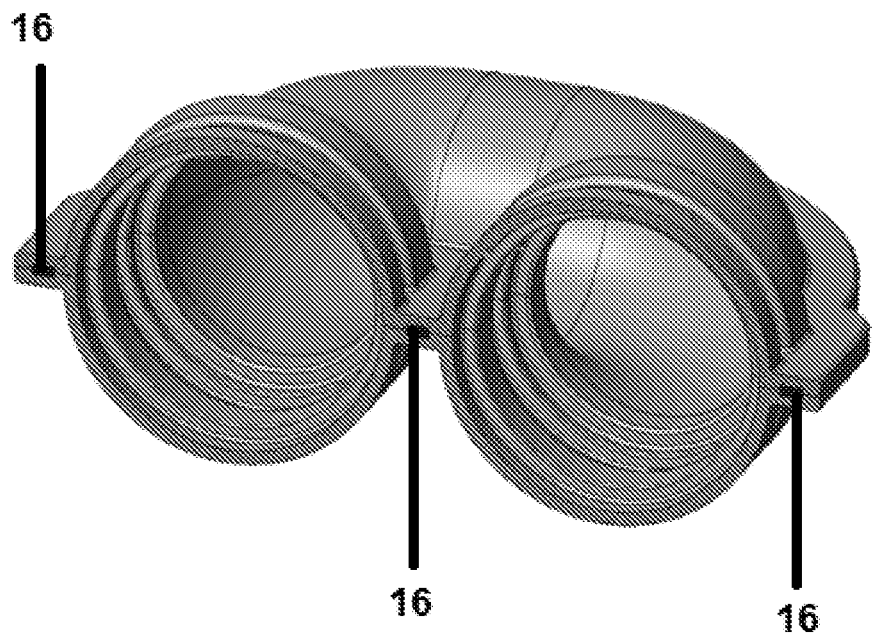
FIG. 13 is a perspective view of a 180° connector in assembled state, that was joined using multi-component injection.
Figure 14:
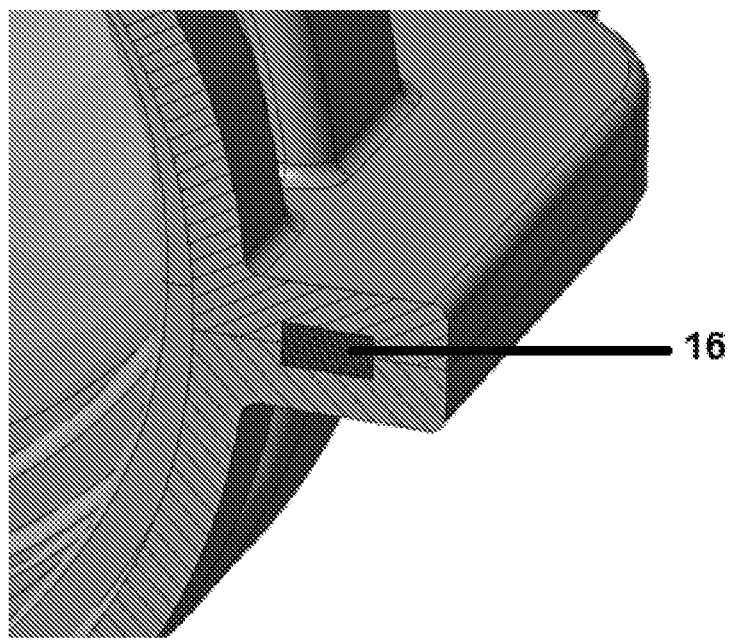
FIG. 14 is an enlarged view if a portion of FIG. 13, showing presence of joining material in one of the grooves.

FIG. 11 shows parts of the 180° connector 9 according to the embodiment of the invention that have bonding grooves 15—one running along the outer edge of the part and the other one running between the connectors' ends 13, wherein said bonding grooves 15 allow for joining said parts by using multi-component injection. In such a case—bonding material 16 is injected into said bonding grooves (see FIG. 12) after both parts of the 180° connector 9 are put together (see FIG. 13 and FIG. 14), and allows for strong bonding and good sealing properties of the bond.

Figure 9:
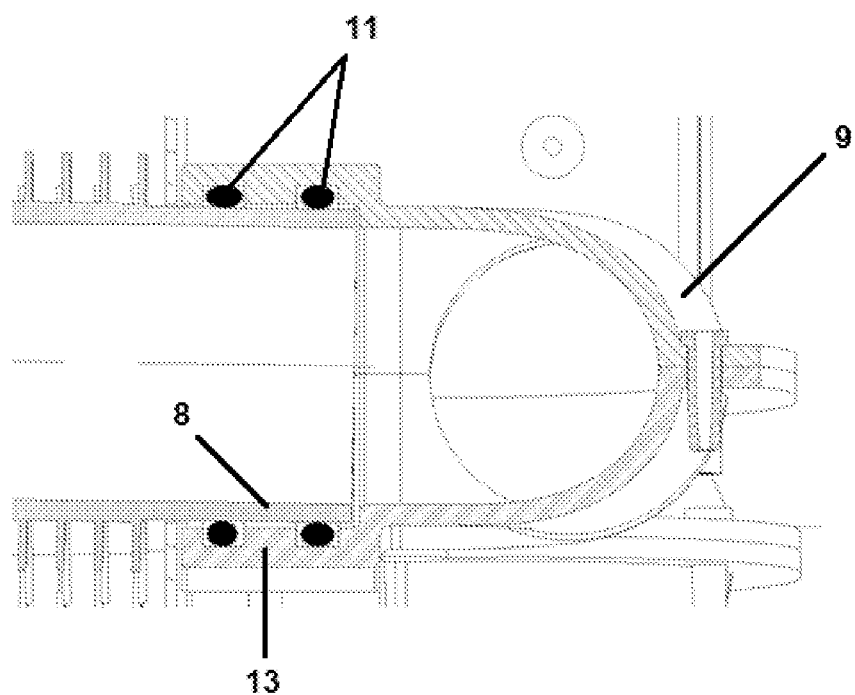
FIG. 9 is a cross-section of the connector from FIG. 8 in its' assembled state.

Each part has two grooves 12 near each of its' ends 13—these grooves 12 are to accommodate elastic seals 11 such as O-rings to ensure that hot gases will not escape from the inside of the finned tubes 7. The internal diameter of the formed connector 9 is identical to that of the finned tubes 7, while the internal diameter of the connector 9 near its' ends 13 is a bit larger than the external diameter of the ends 8 of the finned tubes 7 that are to be accommodated by the connector 9, as to compensate for the non-parallel position of the adjacent finned tubes 7. Resulting free space is compensated by said O-rings (see FIG. 9).

Preferably, the finned tubes 7 are made of metal, such as stainless steel or other metal that is a good heat conductor, such as aluminum or copper.

Preferably, the number of finned tubes 8 in a single steam condenser is determined to be suitable for a particular application, i.e. length, size and number of finned tubes 7 depends on the size/power of the oven to be equipped with such a steam condenser 1. The general surface of heat exchange of the finned tubes 7 (therefore—type, size and spacing of the fins on the finned tubes 7) is chosen as to allow for an efficient condensing and/or cooling of gases that will be flowing through the finned tubes 7. In an exemplary embodiment shown on FIG. 10 there are eight finned tubes 7, but that number can vary and the invention is not limited thereto.

Furthermore, the inclination of the finned tubes 7 is from 0.5° to 10° to the horizontal plane, such as 2°, 4°, 6° or 8°.

The 180° connector 9 is preferably made of plastic material, such as polysulfide or PEEK.

The invention claimed is:

1. A steam condenser for a cooking oven having a housing, having side walls and having at least partly open front side and back side to facilitate flow of cooling air through the steam condenser, and a heat exchanger located in said housing, which serves as a condenser, wherein the heat exchanger comprises a number of connected finned tubes through which water vapor with other gases from the cooking oven are guided, wherein the steam condenser comprises a condensate drainage system, the finned tubes are arranged between the side walls of the housing and in a descending manner, such that each tube has one end attached to the side wall of the housing higher than an other end, while also each two adjacent ends of adjacent tubes are located one higher than the other, wherein the adjacent ends of the adjacent finned tubes are connected by 180° connectors, such that the finned tubes are interconnected in a zigzag manner, wherein the highest or the lowest of the finned tubes is further connected to a final descending tube which is provided with orifices in an upper part and located on the side of the final descending tube that is facing away from the flow of the cooling air.

2. The steam condenser according to claim 1, wherein the inclination of the finned tubes is from 0.5° to 10° to the horizontal plane.

3. The steam condenser according to claim 2, wherein the finned tubes are made of metal.

4. The steam condenser according to claim 3, wherein the 180° connectors are made from two symmetrical parts made of plastic material that is resistant to temperatures of at least 220° C., wherein said parts are joined by screws, rivets, adhesive, pressure welding, multi-component injection, or any combination thereof.

5. The steam condenser according to claim 4, wherein the 180° connectors are further equipped with elastic seals, wherein each of the seals is located in a groove present near the one of the ends of the respective connector, wherein there are two seals by each connectors' end.

6. The steam condenser according to claim 5, wherein the internal diameter of the formed 180° connector is identical to the internal diameter of the finned tubes, while the internal diameter of the connector near the ends is a larger than the external diameter of the ends of the finned tubes that are to be accommodated by the connector.

7. The steam condenser according to claim 6, further comprising a turbine or a ventilator configured to force the flow of gases through the finned tubes.

8. The steam condenser according to claim 7, wherein the turbine or the ventilator is located in direct contact with the final descending tube with orifices.

9. The steam condenser according to claim 8, wherein the turbine or the ventilator is centrifugal.

10. The steam condenser according to claim 6, wherein the finned tube closest to the back side of the housing is the highest one and the finned tube closest to the front side of the housing is the lowest one, wherein the finned tubes are configured such that the gases from the cooking oven are guided to flow from the highest finned tube to the lowest finned tube.

11. A cooking oven equipped with the steam condenser of claim 1.

* * * * *